United States Patent [19]

Smith

[11] Patent Number: 4,495,226

[45] Date of Patent: Jan. 22, 1985

[54] METHOD FOR PREPARING SILICONE-TREATED STARCH

[75] Inventor: Jari K. Smith, Sanford, Mich.

[73] Assignee: Dow Corning Corporation, Midland, Mich.

[21] Appl. No.: 558,212

[22] Filed: Dec. 5, 1983

Related U.S. Application Data

[63] Continuation-in-part of Ser. No. 395,555, Jul. 6, 1982, abandoned.

[51] Int. Cl.³ .............. A21D 4/00; B65B 55/00; C08L 3/00; B32B 9/04
[52] U.S. Cl. .................... 427/326; 106/213; 427/387; 428/447; 428/448; 428/533; 524/47
[58] Field of Search ............ 525/54.24; 536/45, 50, 536/102, 111; 106/213; 524/47; 106/2; 427/326, 387; 428/447, 448, 533; 8/DIG. 1

[56] References Cited

U.S. PATENT DOCUMENTS

| | | | |
|---|---|---|---|
| 2,587,636 | 3/1952 | MacMullen | 8/DIG. 1 |
| 2,647,892 | 8/1983 | LaBrie | 104/2 |
| 3,409,136 | 11/1968 | Simonides | 210/198 |
| 3,419,422 | 12/1968 | Pepe | 162/164.4 |
| 3,462,384 | 8/1969 | Kokoszka | 106/287.14 |
| 3,491,036 | 1/1970 | Fenn | 101/422 |
| 4,021,388 | 5/1977 | Griffin | 523/128 |
| 4,125,495 | 11/1978 | Griffin | 524/51 |

FOREIGN PATENT DOCUMENTS

| | | |
|---|---|---|
| 921204 | 2/1973 | Canada . |
| 891582 | 3/1962 | United Kingdom . |
| 1487050 | 9/1977 | United Kingdom . |

*Primary Examiner*—Theodore Morris
*Attorney, Agent, or Firm*—Andrew H. Ward

[57] ABSTRACT

A method for treating starch with organosiloxane polymers is described in which the organosiloxane polymer is contacted with starch in an aqueous dispersion at a temperature of from 60° C. to 98° C. for a period of at least 60 seconds. Starch treated by this method can be useful as glue, a binder, a filler, or a coating. Starch treated with aminoalkyl- or epoxyalkyl- substituted polydimethylsiloxane is especially useful as a water repellent sizing for substrates such as paper and textiles.

22 Claims, No Drawings

METHOD FOR PREPARING SILICONE-TREATED STARCH

This application is a continuation-in-part of application Ser. No. 395,555, filed July 6, 1982 now abandoned.

BACKGROUND OF THE INVENTION

The present invention relates to a method of treating starch with organosiloxane polymers and to the treated starch. The present invention further relates to the use of said treated starch in a process for sizing substrates, such as paper or textiles and to the sized substrate.

Starch is used in a wide variety of applications. It is often used as a glue, a binder, or a filler for polymeric compositions such as plastic or rubber. One particularly important use of starch is as sizing.

In the sizing process, starch is used to level surfaces, thus rendering the surfaces smoother. For example, starch sizing is applied to paper to make it smoother, glossier, and more receptive to printing inks. Textiles are sized with starch to provide better body, stiffness, and smoothness.

It is often desirable to modify starch chemically. For example, starch is modified to produce less viscous aqueous dispersions of the starch, or the starch is modified to be more water repellent in the dry state.

Increased water repellency is a highly desirable property in starch used as glue or binder material. Starch of greater water repellency is especially desirable for sizing paper to be used in an offset printing process.

Offset printing requires that the paper be wetted with water except where it is desired to print. Rewetting occurs for each color printed. After a series of wettings, untreated starch sizing may be solubilized, allowing the underlying paper to swell and weaken. The swollen paper breaks more easily and cockles upon drying.

A number of attempts to modify starch with various silicones have been made.

Griffin, in U.S. Pat. Nos. 4,021,388 and 4,125,495, discloses the treatment of starch with sodium alkylsiliconate in water, as well as the treatment of starch, in the dry state, with hydrogen polydimethylsiloxane. Starches treated by each of these two methods were used as fillers for biodegradable plastic compositions. Silicone treatment of the starch improved the strength of the plastic compositions.

Musolf, in Canadian Pat. No. 921,204, discloses the incorporation of a solid siloxane into an aqueous slurry of starch. Textiles subsequently sized with the starch were more soil repellent.

British Pat. No. 891,582, discloses the use of an alkali metal siliconate to treat starch. The alkali metal siliconate was added to starch in cold water. Patentees in this case found that methylhydrogensiloxane and dimethylsiloxane compositions were not suitable for treating starch in a room temperature aqueous dispersion because the treated starch produced an uneven, fish-eyed, surface when applied to paper as sizing.

Kokoszka and Yates, in U.S. Pat. No. 3,462,384, disclose the incorporation of a polydimethylsiloxane emulsion in an aerosol starch formulation, to improve the spray pattern and diminish the lateral force necessary to iron clothes sprayed with the aerosol starch formulation. The silicone emulsion in this case was added to an aqueous starch dispersion cooled to room temperature.

Simonides, in U.S. Pat. No. 3,409,136, discloses the addition of an aqueous methylsilicone oil suspension to a cool aqueous starch dispersion, for the purpose of rendering an adhesive, based on the treated starch, more water repellent.

Pepe, in U.S. Pat. No. 3,419,422, discloses isocyanate functional polydiorganosiloxanes, which can provide a water repellent paper size either per se, or when mixed with a starch dispersion.

None of the above patents disclose the present invention, which comprises contacting starch and a silicone, in an aqueous dispersion, at a temperature of from 60° C. to 98° C., for a period of time at least 60 seconds in duration. The addition of silicones to dry starch or the addition of silicones to a room temperature aqueous dispersion of starch, is less effective than the method of the present invention.

BRIEF SUMMARY OF THE INVENTION

It is an object of the present invention to provide a method for treating starch with organosiloxane polymers. It is a further object of this invention to provide a method for producing treated starch which is useful as a sizing, a filler, a glue, or a binder. A further object of this invention is to provide an improved process for sizing substrates and sized substrates obtained therefrom.

These and other objects will be apparent to those skilled in the organosilicon chemistry or industrial starch art upon consideration of the following specification and claims.

In one aspect, the present invention relates to a method for treating starch with organosiloxane polymers comprising contacting the organosiloxane polymer and the starch in an aqueous dispersion heated to a temperature of from about 60° C. to about 98° C. for at least 60 seconds. In another aspect, the present invention relates to an improved process of sizing substrates, using the starch treated by the method of this invention, and to sized substrates obtained therefrom.

DETAILED DESCRIPTION OF THE INVENTION

This invention relates to a method for treating starch, said method comprising contacting said starch with from about 0.1% to about 15% by weight, based on the weight of the starch, of an organosiloxane polymer, said contacting being done in water, at a temperature of from about 60° C. to about 98° C., for a period of time at least 60 seconds in duration.

This invention further relates to a process for sizing a substrate, said process comprising, (A) applying an aqueous dispersion of treated starch to said substrate, said aqueous dispersion of treated starch having been prepared by contacting said starch with from about 0.1% to about 15% by weight, based on the weight of the starch, of an organosiloxane polymer, said contacting being done at a temperature of from about 60° C. to about 98° C., for a period of time at least 60 seconds in duration, and (B) subsequently causing the water to evaporate from the applied aqueous dispersion.

The organosiloxane polymers that are used in the method of the present invention consist essentially of three or more siloxane units having the formula $R_aSiO_{(4-a)/2}$, joined to one another by siloxane, i.e. $\equiv Si-O-Si\equiv$ bonds. In the unit formula, a has a value of 0, 1, 2, or 3 and R is a silicon-bonded radical selected from the group consisting of hydrocarbon radicals, hydrocarbonoxy radicals, substituted hydrocarbon radicals, substituted hydrocarbonoxy radicals, and the hydroxyl radical.

Examples of the hydrocarbon radicals include alkyl, such as methyl, ethyl, propyl, isobutyl, butyl and octyl; alkenyl, such as vinyl and allyl; alkynyl, such as —CH$_2$C≡CH and —CH$_2$CH$_2$C≡CH; cycloalkyl, such as cyclohexyl and cycloheptyl; aryl, such as phenyl and napthyl; alkaryl, such as tolyl and xylyl; or aralkyl, such as benzyl and phenylethyl.

Examples of substituted hydrocarbon radicals include hydrocarbon radicals such as those described above substituted with halogen atoms, such as fluorine, chlorine and bromine; amino groups, such as —NH$_2$, —NHCH$_3$, —NHCH$_2$CH$_2$CH$_2$NH$_2$, and —NHCH$_2$CH$_2$NH$_2$; hydroxyl groups; epoxy groups; carboxy groups; uriedo groups; cyano groups; acrylato groups; isocyanato groups; and acetoxy groups. Illustrative of substituted hydrocarbon radicals are chloropropyl, 3,3,3-trifluoropropyl, dichlorophenyl, —CH$_2$CH$_2$CH$_2$NH$_2$,

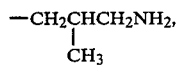

—CH$_2$CH$_2$CH$_2$NHCH$_2$CH$_2$NH$_2$,

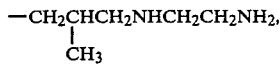

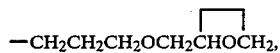

mercaptopropyl, hydroxypropyl, cyanopropyl, acrylatopropyl, uriedopropyl, isocyanatopropyl, and isocyanatotolyl.

Hydrocarbonoxy radicals are hydrocarbon radicals, such as those recited above, bonded to the silicon atom through a carbon-oxygen-silicon bond. Illustrative of hydrocarbonoxy radicals are methoxy, ethoxy, isobutoxy, butoxy, propoxy, isopropoxy, polyethylene glycoloxy and phenoxy.

Substituted hydrocarbonoxy radicals are hydrocarbonoxy radicals, such as those recited above substituted with halogen atoms, such as fluorine, chlorine and bromine; amino groups such as —NH$_2$, —NHCH$_3$, —NHCH$_2$CH$_2$CH$_2$NH$_2$, and NHCH$_2$CH$_2$NH$_2$; hydroxyl groups; epoxy groups; carboxy groups; uriedo groups; cyano groups; acylato groups; isocyanato groups; and acetoxy groups. Illustrative of substituted hydrocarbonoxy radicals are chloropropoxy, aminopropoxy, hydroxypropoxy, mercaptopropoxy, epoxypropoxy, uriedopropoxy, cyanopropoxy and isocyanatopropoxy.

The organosiloxane polymers useful in the method of the present invention are preferably soluble in an appropriate solvent as hereinafter defined. Thus it is desirable to limit the degree of polymerization (the number of siloxane units), and/or the degree of substitution (the average number of R radicals per silicon atom) of the organosiloxane polymer according to well-known principles in order to provide solubility of the organosiloxane polymer in the appropriate solvent.

The organosiloxane polymers useful in the method of the present invention should contain only a limited number of R radicals known to react with water. Thus, for example, no more than 10% or 15% of the R radicals should be reactive with water.

Preferably, the number of R radicals per siloxane unit and the number of siloxane units in the organosiloxane polymer are selected such that the average number of R radicals per silicon atom in the organosiloxane polymer is from about 1.5 to 2.5, and the number of $R_aSiO_{(4-a)/2}$ units in the organosiloxane polymer is greater than 5.

It is more preferred that the organosiloxane polymers used in the method of the present invention be composed of a suitable number and type of $R_aSiO_{(4-a)/2}$ units such that the average number of R radicals per silicon atom in the organosiloxane polymer be from about 1.9 to 2.1, exclusive of the $R_aSiO_{(4-a)/2}$ units at the terminal ends of said organosiloxane polymer, wherein the average number of R radicals per terminal silicon atom is 3. Organosiloxane polymers having an average number of R radicals per non-terminal silicon atom from about 1.9 to 2.1 are referred to herein as polydiorganosiloxanes.

Preferred organosiloxane polymers are polydiorganosiloxanes having the formula $R_3SiO(R_2SiO)_xSiR_3$ wherein each R is selected from the group consisting of hydrocarbon radicals, substituted hydrocarbon radicals, hydrocarbonoxy radicals, substituted hydrocarbonoxy radicals, and the hydroxy radical, said radicals as hereinabove delineated, and wherein x has an average value of 1 or more.

For the purpose of providing a water repellent starch sizing, the organosiloxane polymer is preferably a polydiorganosiloxane described by the formula MeR'$_2$Si(Me$_2$SiO)$_y$(MeR''SiO)$_z$SiMeR'$_2$, wherein Me represents the —CH$_3$ radical, R' is selected from the group consisting of the methyl radical, the hydroxy radical, and the methoxy radical, R'' is an aminoalkyl or epoxyalkyl radical, y has an average value of from about 10 to about 600, and z has an average value of from about 1 to about 25.

The aminoalkyl radicals particularly useful in rendering starch sizing more water repellent have the formula —C$_n$H$_{2n}$NH$_2$, wherein n has a value of 1,2,3 or higher, or the formula —C$_n$H$_{2n}$NHC$_m$H$_{2m}$NH$_2$, wherein n has a value of 1,2,3 or higher, and m has a value of 1,2,3 or higher.

The epoxyalkyl radicals particularly useful in rendering starch sizing more water repellent have the formula

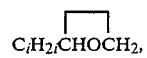

wherein i has a value of 1,2,3 or higher, or the formula

wherein k has a value of 1,2,3 or higher, and j has a value of 1,2,3 or higher.

Highly preferred polydiorganosiloxanes for rendering starch sizing water repellent are those polymers of the formula Me₃SiO(Me₂SiO)ᵧ(MeSiO)₂SiMe₃, or
|
CH₂CH₂CH₂NHCH₂CH₂NH₂

Me₃SiO(Me₂SiO)ᵧ(MeSiO)₂SiMe₃,
|        ┌─┐
CH₂CH₂CH₂OCH₂CHOCH₂, wherein y has a value of from about 10 to about 600, z has a value of from about 1 to 25, and the ratio of y:z is from about 2.5:1 to about 200:1. More preferably the ratio of y:z is from about 10:1 to about 100:1. Most preferably the ratio of y:z is from about 14.3:1 to about 66.7:1.

The organosiloxane polymers useful in the method of the present invention can be synthesized by several methods known in the art. By way of example, full or partial hydrolysis and subsequent condensation of appropriately selected hydrolyzable silanes, such as alkoxysilanes and chlorosilanes, is a suitable synthetic method.

The best method known at this time, to synthesize the polydiorganosiloxanes preferred for use in rendering starch sizing more water repellent, is acidic or basic equilibration of suitable amounts of alpha, omega, bis(-trimethylsiloxy)polydimethylsiloxane with an alkoxysilane of the formula MeR″Si(OMe)₂ wherein Me represents the —CH₃ radical, and R″ represents an aminoalkyl or epoxyalkyl radical as hereinabove defined.

The method of the present invention is not thought to be adversely affected by small amounts of contaminants in the organosiloxane polymer. The organosiloxane polymer can contain small amounts, such as 10% or 15%, of unreacted starting materials, and/or other organosilicon compounds.

Two or more organosiloxane polymers may be mixed in practicing the present invention.

The starch used in the method of the present invention can be derived from a wide variety of plant species, such as corn, wheat, rice, tapioca, potato, arrowroot, sorghum, sago palm, and the like. Starch derived from corn is most commonly used industrially, and is preferred starch for the practice of this invention.

The starch used in the method of the present invention can be unaltered, or chemically altered. Examples of chemically altered starch are slightly oxidized starch, or partially derivatized starch, such as partially ethoxylated starch.

In the method of this invention, starch is contacted with an organosiloxane polymer in an aqueous system at a temperature of from about 60° C. to about 98° C. for at least 60 seconds.

The starch can be dispersed in water, to form an aqueous starch dispersion, before addition of the organosiloxane polymer, simultaneously with addition of organosiloxane polymer, or the starch can be dispersed in a prior-formed aqueous dispersion of organosiloxane polymer. Preferably, the aqueous starch dispersion is formed before organosiloxane polymer addition thereto.

An aqueous starch dispersion can be formed by adding the desired amount of starch to the desired amount of the aqueous phase and agitating the resultant mixture until it appears homogeneous. Heating this mixture to a temperature of from about 60° C. to about 98° C. for a period of time at least 60 seconds in duration is sufficient to gelatinize the starch, i.e., such heating will substantially reduce the crystallinity of the dissolved starch.

Said heating can be done in any convenient manner as long as the starch and the organosiloxane polymer are contacted, in water, for the stated period of time and at a temperature within the stated temperature range.

Preferably, an aqueous dispersion of starch is heated to the stated temperature, the organosiloxane polymer is added thereto, and the temperature of the resulting mixture is maintained at the stated value for at least 60 seconds. Alternatively, a mixture of starch, organosiloxane polymer and water can be formed at a lower temperature, such as at room temperature, and the mixture heated to the stated temperature and maintained at that temperature for at least 60 seconds. Alternatively, starch can be admixed with an aqueous dispersion of organosiloxane polymer at the stated temperature and the temperature of the resulting mixture maintained at the stated value for at least 60 seconds. Alternatively, an aqueous starch dispersion and an organosiloxane polymer, each having the stated temperature, can be mixed and the temperature of the resulting mixture maintained at the stated value for at least 60 seconds. Other methods for achieving the contacting required by this invention will be obvious to those skilled in the starch-treating art.

The organosiloxane polymers used in the method of the present invention can be added to water or to the aqueous starch dispersion either per se, as a solution, or as an emulsion.

In the case of per se addition, mechanical dispersion means are frequently necessary, because the organosiloxane polymer will not normally be compatible with water or the aqueous starch dispersion. The organosiloxane polymer can be dispersed by such means as a colloid mill or Kady ® mill. These mills are frequently used to disperse other components, such as clay, in aqueous starch dispersions.

It is preferred to add the organosiloxane polymer as a solution or as an emulsion to the aqueous starch dispersion to facilitate dispersion therein.

In the case of adding the organosiloxane polymer as a solution, the solvent selected should have some degree of compatibility with the aqueous starch dispersion. Of course, solvents which are reactive with either the organosiloxane polymer or the aqueous starch dispersion should be avoided.

Examples of appropriate solvents are those having solubility parameter values between about $2.25 \times 10^4$ and $2.45 \times 10^4$ $(J/m^3)^{178}$, such as alcohols, such as normal propanol, isopropanol, cyclohexanol, normal butyl alcohol, and 1,5 pentane diol; ethers, such as ethylene glycol dimethylether and ethylene glycol diphenylether; amines, such as methylamine; nitrogen-containing heterocyclic solvents, such as 2-methylpyrolidone, formylpiperidine and acetylmorpholine. Isopropanol is a preferred solvent when a solvent is used in the practice of the method of the present invention.

The concentration of the organosiloxane polymer in the solution is not thought to be critical, and can range from about 1% to about 80% by weight, and more preferably from about 5% to about 60% by weight.

Solutions of organosiloxane polymer can be prepared by mixing together the appropriate amounts of organosiloxane polymer and solvent, and agitating the mixture until it appears homogeneous.

Emulsions of the organosiloxane polymer can be used in the method of the present invention. Said emulsions can be prepared either by emulsion polymerization of appropriate starting materials, as disclosed in U.S. Pat.

No. 2,891,920, which is hereby incorporated herein by reference for the purpose of teaching how to prepare emulsion polymerized emulsions of organosiloxane polymers, or a mechanical emulsion of the organosiloxane polymer can be prepared.

A mechanical emulsion of the organosiloxane polymer can be prepared by thoroughly mixing the desired quantities of organosiloxane polymer and water using high energy mechanical dispersion means, such as a high intensity mixer, colloid mill, or a sonic field generator.

To obtain a stable emulsion, effective amounts of one or more surfactants can be incorporated in the water. The identity of the surfactant is not narrowly critical and can be, for example anionic, cationic, or nonionic.

Examples of suitable anionic surfactants include sulfonation products of saturated acids and their glycerides, sulfonation products of amides, phosphoric esters of the above-named groups, alkaryl sulfonates and the like.

Examples of suitable cationic surfactants include aliphatic amines, aromatic amines with aliphatic substituents, quarternary ammonium compounds, polyethylenediamine, polypropanolpolyethanolamines and the like.

Examples of suitable nonionic surfactants include condensation products of fatty substances with ethylene oxide, condensation products of phenolic compounds having aliphatic side chains with ethylene oxide and the like.

The concentration of the organosiloxane polymer in the emulsion is not thought to be critical, and can be from about 0.5% by weight to about 70% by weight, and more preferably from about 5% by weight to about 45% by weight.

If the object in treating starch by the method of the present invention is to provide starch of enhanced water-resistance, care should be taken to incorporate the surfactant in the organosiloxane polymer emulsion at the minimum level consistent with the stability desired, since surfactants are well known to decrease water repellency.

Effective concentrations of surfactant range from about 0.05% to about 10% based on the total weight of the emulsion. Preferably, the concentration is below 6%, and most preferably below about 5%.

Additives well known to the emulsion art can be incorporated in the emulsion of organosiloxane polymer.

Examples of such additives are freeze-thaw stabilizers, such as ethylene glycol, viscosity adjusters, antimicrobials, and the like.

The optimum concentration of starch in the aqueous starch dispersion is controlled by a variety of factors, such as the molecular weight of the starch, the viscosity it is desired to maintain in the aqueous starch dispersion and the desired end use of the treated starch. Concentrations of starch can range from about 1% to about 50% based on the total weight of the aqueous starch dispersion.

For coating applications, such as sizing, concentrations of starch from about 1% to about 30% are typical. For binder or adhesive applications, concentrations of starch from about 10% to about 50% are typical.

Chemically altered starch can generally be used at higher concentrations because it yields dispersions of lower viscosity than unaltered starch.

The amount of organosiloxane polymer to be used in the method of this invention ranges from about 0.1% to about 15% by weight, based upon the weight of starch to be treated. More preferably, from about 1% to about 5% by weight, based upon the weight of starch of organosiloxane is added.

It is often desired to add other components to the aqueous starch dispersion. For example, it might be desirable to incorporate various other components in an aqueous starch dispersion intended to be used for sizing paper. Illustrative of such other components are clay; white pigments such as calcium carbonate, titania, satin white, and blanc fixe; colored pigments, such as chrome yellow, carbon black and iron oxide; adhesive agents such as casein and soy protein; defoamers; viscosity adjusters; and finishing aids such as waxes. The addition of said other components is within the scope of this invention.

After the organosiloxane polymer has been contacted with the starch in an aqueous dispersion according to the method of this invention, the dispersion can be concentrated. It can be concentrated, for example, by distillation to provide a paste useful as a binder or adhesive. The dispersion can be dried to a friable solid and ground mechanically for other uses, e.g. as a filler for plastic compositions. The dispersion can be spray dried to provide a free flowing powder. Advantageously, the dispersion can be used directly, such as for sizing or other coating processes.

It is an aspect of this invention that the aqueous dispersion of organosiloxane-treated starch can be used in a process for sizing substrates, such as mineral substrates, such as gypsum; paper substrates; or textile substrates.

The aqueous dispersion of organosiloxane-treated starch can be applied to paper in a dry end process, either on-machine or off-machine.

Examples of equipment useful in applying the aqueous dispersion of organosiloxane-treated starch to paper include roll coaters, such as size presses, reverse roll coaters, kiss coaters, air doctors, trailing blade coaters, and knife coaters.

After application of the aqueous dispersion of organosiloxane-treated starch to the paper the water from the aqueous dispersion is caused to evaporate in a drying step. The drying step comprises heating the damp substrate to a temperature not to exceed the temperature at which significant deterioration of the substrate will take place, until the substrate is dry, or simply allowing the water to evaporate at ambient temperature and pressure.

The aqueous dispersion of organosiloxane-treated starch resulting from the method of the present invention can be applied as a sizing to any paper, such as thermomechanically or chemically pulped papers, groundwood, freesheets, boxboard and the like.

The method of the present invention is especially beneficial in providing an economical, water repellent starch sizing for publication grade paper used in offset printing. Both cost of sizing and water repellency are critical for this application. For example, it has been found that a starch sizing treated with 5% by weight of an organosiloxane polymer renders starch sizing water resistant, at 1.2 lbs. of organosiloxane-treated starch per ream of paper.

The process of the present invention is also useful for sizing textile fabrics, especially those containing a significant amount of cellulosic fibers, such as cotton, rayon, acetate, and blends of these fibers with one another or with other fibers, such as polyester fibers. The method of the present invention has particular utility in sizing denim fabrics.

The aqueous dispersion of treated starch from the method of the present invention can be applied to textile substrates by immersion, spraying, curtain coating and the like. Most commonly, it is applied by immersion of the textile into the aqueous dispersion of treated starch, followed by padding, i.e. squeezing excess aqueous dispersion of treated starch from the fabric through two or more rollers. The sized textile can be dried by causing the water from the dispersion to be removed. Preferably the water is removed in a pressing step for a textile fabric.

Textile thread can be sized by passing the thread through the aqueous dispersion of treated starch and removing excess aqueous dispersion of treated starch by an air doctor, squeeze rolls or the like.

While not wishing to be bound by a particular theory, it is believed, at the present time, that treatment of starch by the method of the present invention results in the formation of chemical bonds between the organosiloxane polymer and starch molecules. This belief is supported, to some extent, by extraction studies, which have shown a substantial decrease in the extractable fraction of starch upon treatment by the method of the present invention. In addition, differential scanning calorimetry experiments, comparing starch treated by the method of the present invention to untreated starch, indicate a substantial loss of crystallinity in the treated starch. This loss is consistent with the formation of bonds between the silicone and starch molecules.

The water repellency conferred by the method of the present invention can be measured by a number of known tests.

TEST PROCEDURES

Water repellency was measured herein by one of the two following methods for determining water drop hold out time.

In a first method, drops of water are placed upon the sized substrate and the time from placement of the drops to the time when the drops are absorbed is measured.

In a second method, a Hercules ® Size Tester is used to provide a more sophisticated and reliable method of measuring water drop hold out time. 10 ml of aqueous dye is placed upon the substrate, and the decrease in scattered light intensity is continuously monitored. An 80% decrease in intensity is defined as penetration, and signals the end of the timing period which began with drop placement.

Sized paper was visually examined in the following examples for defects or irregularities in the coating. Such defects or irregularities are referred to herein as fisheyes.

In order that those skilled in the art may better understand the present invention, the following examples of the invention are disclosed. These examples of the invention are intended to be illustrative rather than limiting. In the examples, parts and percentages are by weight unless otherwise indicated, and Me represents the —CH$_3$ radical.

Nine organosiloxane polymer compositions were used in the examples:

Compositions I—A mechanical emulsion consisting of

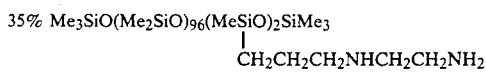

1% ethylene glycol
59.8% water
4.2% of a mixture of TMN-6, a nonionic surfactant sold by the Union Carbide Corp. of Danbury, CT, and Triton X-405, a nonionic surfactant sold by Rohm & Haas of Philadelphia, PA.

Composition II—A mechanical emulsion consisting of

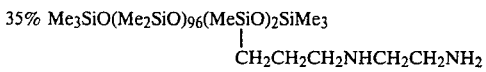

60.8% water
4.2% of a mixture of TMN-6, a nonionic surfactant sold by the Union Carbide Corp. of Danbury, CT, and Triton X-405, a nonionic surfactant sold by Rohm & Haas of Philadelphia, PA.

Composition III—A mechanical emulsion consisting of

40% of a mixture of

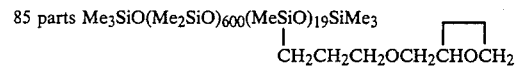

15 parts HOMe$_2$SiO(Me$_2$SiO)$_{400}$H
54.6% water
5.4% of a mixture of TMN-6, a nonionic surfactant sold by the Union Carbide Corp. of Danbury, CT, and Triton W-30, a nonionic surfactant sold by Rohm & Haas of Philadelphia, PA.

Composition IV—A solution consisting of
50% isopropanol
6% glacial acetic acid
44% the reaction product of
  75 parts HOMe$_2$SiO(Me$_2$SiO)$_9$H
  10 parts MeSi(OMe)$_3$
  15 parts NH$_2$CH$_2$CH$_2$NHCH$_2$CH$_2$CH$_2$Si(OMe)$_3$ Composition V—A polymer having the average formula

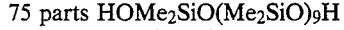

Composition VI—A mechanical emulsion consisting of
60% Me$_3$SiO(Me$_2$SiO)$_{130}$SiMe$_3$
35.3% water
4.7% of a mixture of TMN-6, a nonionic surfactant sold by the Union Carbide Corp. of Danbury, CT, and Triton W-30, a nonionic surfactant sold by Rohm & Haas of Philadelphia, PA.

Composition VII—A mechanical emulsion consisting of
40% Me$_3$SiO(MeHSiO)$_4$SiMe$_3$
57.1% water
2.86% carboxymethylcellulose
0.034% sorbic acid Composition VIII—A polymer having the average formula

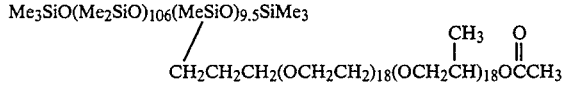

HO(CH$_2$CH$_2$O)$_{14}$(Me$_2$SiO)$_{16}$(CH$_2$CH$_2$O)$_{14}$H

Composition IX—A polymer having the average formula

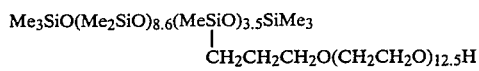

Three types of paper were used in the examples. These papers are characterized in Table 1.

TABLE 1

| | Papers Used in Testing | | |
|---|---|---|---|
| Property | S. D. Warren Heavy | S. D. Warren Light | St. Regis #5 publication |
| Paper type | chemically pulped | chemically pulped | thermo-mechanically pulped |
| Basis weight | 60.5 lbs/ream | 35 lbs/ream | 35 lbs/ream |
| Gurly density | 50 seconds | 39 seconds | — |
| SDW porosity | 1560 | 1782 | — |
| Scott bond | 110 LS | 165 HS | — |

Three representative starches were used in the examples. There were:

Pearl starch: Clinton 106B, Clinton Corn Processing Co., Clinton, IA.

Slightly Oxidized starch: Clinco ® 330D, Clinton Corn Processing Co., Clinton, IA.

Hydroxyethylated starch: Ethylex ® 2030, A. E. Staley Mfg. Co., Decatur, IL.

EXAMPLE 1

A 5% aqueous dispersion of pearl starch was prepared by agitating 5 parts of pearl starch with 95 parts of water in a three neck flask equipped with a condenser, thermometer, stirring rod with paddle, and a valved drain spout on the bottom of the flask. This dispersion was heated to 96° C. for 30 minutes, with continued agitation.

An aliquot of 250 ml of this starch dispersion was removed from the flask, transferred to a smaller flask, and 1.8 g of Composition I were added. This addition provided 5% organosiloxane polymer based on the total weight of starch in the sample withdrawn.

This mixture of starch dispersion and Composition I was allowed to react 10 min. at 90° C.

The resulting dispersion of treated starch was then applied to each of the three papers in Table 1 with a #10 Mayer Rod.

The paper coated in this manner was dried on a photographic paper drier. This apparatus comprises heating elements under a smooth copper surface, and a canvas cover. The paper was placed on the copper surface with the treated side up. The canvas cover was bolted tightly over the paper, and the paper was dried by heating the heating elements.

The dried paper had an even surface, with no apparent fisheyes.

The dried paper was tested for water repellency by the first water drop hold out test previously described. Results of this testing are displayed in Table 2.

EXAMPLES 2–9

The procedure of Example 1 was repeated for Compositions II through IX. The amount of composition added in each case was that necessary to provide 5% by weight of organosiloxane polymer based on the weight of starch in the dispersion. The results of water repellency testing conducted upon the dried paper are displayed in Table 2. No fisheyes were apparent.

TABLE 2

| | | Clinton ® 106B Pearl Starch Water Drop Holdout Time (Seconds) | | |
|---|---|---|---|---|
| Example | Organo-siloxane Composition | S. D. Warren Heavy | S. D. Warren Light | St. Regis #5 |
| 1 | I | 90 | 90 | 120 |
| 2 | II | >120 | 105 | 60 |
| 3 | III | 30 | 25 | 35 |
| 4 | IV | >120 | >120 | 45 |
| 5 | V | 8 | 5 | 5 |
| 6 | VI | 8 | 6 | 8 |
| 7 | VII | 12 | 7 | 40 |
| 8 | VIII | 9 | 6 | 7 |
| 9 | IX | 9 | 6 | 5 |
| Control[1] | | 4–14 | 4–13 | 10–120 (average 35) |

[1]The control was generated by following the procedure set forth in Example 1, but omitting the organosiloxane polymer addition.

EXAMPLES 10–18

The procedure of Examples 1–9 was followed, with Clinco ® 330D slightly oxidized starch at a concentration of 8% of the aqueous dispersion in place of pearl starch at 5% of the aqueous dispersion. No fisheyes were apparent on the resulting sized paper.

The results of water repellency testing of the resulting sized paper are displayed in Table 3.

TABLE 3

| | | Clinco ® 330D Slightly Oxidized Starch Water Drop Holdout Time (Seconds) | | |
|---|---|---|---|---|
| Example | Organo-siloxane Composition | S. D. Warren Heavy | S. D. Warren Light | St. Regis #5 |
| 10 | I | 60 | 50 | 40 |
| 11 | II | >150 | >150 | >150 |
| 12 | III | 120 | 90 | >240 |
| 13 | IV | >180 | 120 | 180 |
| 14 | V | 3 | 8 | 13 |
| 15 | VI | 8 | 11 | 25 |
| 16 | VII | 10 | 14 | 100 |
| 17 | VIII | 7 | 10 | 4 |
| 18 | IX | 5 | 8 | 10 |
| Control[1] | | 5–7 | 6–12 | 95–180 (average 146) |

[1]The control was generated by following the procedure set forth in Examples 10–18, but omitting the organosiloxane polymer addition.

EXAMPLES 19–27

An aqueous dispersion, 20% by weight of Ethylex ® 2030 hydroxyethylated starch, was prepared as in Example 1. To 100 ml of the aqueous dispersion of hydroxyethylated starch were added 151 g of a clay slurry consisting of:

50 g water 1 g Na$_4$P$_2$O$_7$.10H$_2$O 100 g Huber Hydrafine ® clay a product of the J. M. Huber Corporation of Edison N.J.

Organosiloxane compositions I through IX were added to the mixture of aqueous dispersion and clay slurry at a level of 2.5 parts of organosiloxane polymer to 97.5 parts mixture of dispersion and slurry. Said addition provided 12.5% by weight of the organosiloxane polymer based on the weight of the starch. This mixture was heated to 90° C. for 10 min. as in previous examples, then coated on paper as before, and dried as before. No fisheyes were apparent.

Water repellency was tested on the resulting sized paper using the first water drop holdout test described above. The results of this testing are displayed in Table 4.

TABLE 4

Ethylex ® 2030 Hydroxyethylated Starch, Plus Clay
Water Drop Holdout Time (Seconds)

| Example | Organo-siloxane Composition | S. D. Warren Heavy | S. D. Warren Light | St. Regis #5 |
|---|---|---|---|---|
| 19 | I | 150 | 50 | 45 |
| 20 | II | 30–90 | 50 | 50 |
| 21 | III | *300 | 20 | 16 |
| 22 | IV | 30–60 | 20 | 16 |
| 23 | V | 45 | 20 | 10 |
| 24 | VI | 15–180 | 40 | 15 |
| 25 | VII | 150 | 40 | 35 |
| 26 | VIII | 60 | 40 | 5 |
| 27 | IX | 120 | 35 | 10 |
| Control[1] | | 30–180 | 30–60 | 10–20 |

[1]The control was generated by following the procedure set forth in Examples 19–27, but omitting the organosiloxane polymer addition.

EXAMPLE 28

The process of the present invention was carried out in pilot plant equipment. A 5% aqueous dispersion of pearl starch was made and treated by the general procedure of Example 1 with appropriate increases in the amounts of ingredients used. The resulting starch, treated with Composition I, was applied to St. Regis #5 paper by a size press. A control was generated using untreated starch and identical paper.

A Hercules ® Size Tester was used to measure the water repellency of paper sized with treated and untreated starch.

The results obtained, at a coating level of 1 lbs. of coating per ream of paper, were 23 seconds for paper coated with starch treated by Composition I, and 3 to 6 seconds for the paper coated with the untreated starch. No fisheyes were apparent.

EXAMPLE 29

The procedure of Example 28 was repeated using Composition IV as the source of organosiloxane polymer. A control sample coated with untreated starch was also generated.

At a coating weight of 1.2 lbs. of coating per ream of paper, Hercules ® Sizing Tester results were found to be 60 seconds for the paper sized with Composition IV modified starch, and 3 seconds to 8 seconds for the paper sized with the unmodified starch of the control. No fisheyes were apparent.

EXAMPLES 30–32

A 4% aqueous dispersion of Clineo ® 712D, an hydroxyethylated starch product of the Clinton Corn Processing Co., Clinton IA, was made. This dispersion of starch was then treated, by the general procedure set forth in Example 1, with a 35% aqueous emulsion of a polydiorganosiloxane, said polydiorganosiloxane having the general formula:

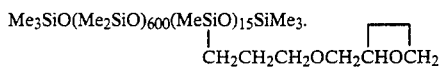

Aqueous dispersions of starch, said starch being treated by 0.1%, 0.25% and 0.5% of the above polydiorganosiloxane, were obtained following the general procedure of Example 1.

Each of these three treated starch dispersions, along with an untreated control starch dispersion, were used to size Eastern Fines paper at a coating level of about 0.46 pounds/ream/3000 square feet. The resulting sized paper was tested for water repellency with the Hercules ® Size Tester. The results of this testing can be found in Table 5.

TABLE 5

Clineo ® 712D Hydroxyethylated Starch Treated with the
Polydiorganosiloxane of Examples 30–32

| Example | % polydiorgano-siloxane | Hercules ® Size Tester Results (seconds)* |
|---|---|---|
| 30 | 0.1% | 117.4 |
| 31 | 0.25% | 127.1 |
| 32 | 0.50% | 121.4 |
| control (untreated starch) | 0 | 99.6, 109.7 |
| uncoated paper | 0 | 37.1 |

*average of five determinations

That which is claimed is:

1. A method for treating starch, said method comprising contacting said starch with from about 0.1% to about 15% by weight, based on the weight of the starch, of an organosiloxane polymer, said organosiloxane polymer consisting essentially of three or more siloxane units having the formula $R_aSiO_{(4-a)/2}$, said siloxane units being joined to one another by siloxane bonds, wherein a has a value of 0, 1, 2 or 3 and R is a silicon-bonded radical selected from the group consisting of hydrocarbon radicals, hydrocarbonoxy radicals, substituted hydrocarbon radicals, substituted hydrocarbonoxy radicals, and the hydroxyl radical, with the proviso that any hydroxyl radicals are present only on terminal $R_aSiO_{(4-a)/2}$ units, said contacting being done in water, at a temperature of from about 60° C. to about 98° C. for a period of time at least 60 seconds in duration.

2. The method of claim 1 wherein said contacting is done by adding the organosiloxane polymer to an aqueous dispersion of the starch.

3. The method of claim 2 wherein said aqueous dispersion of the starch is at a temperature of from about 60° C. to about 98° C. when the organosiloxane polymer is added to the aqueous dispersion of the starch.

4. The method of claim 1 wherein said contacting is done by adding the starch to an aqueous dispersion of the organosiloxane polymer.

5. The method of claim 1, 2, 3, or 4 wherein the organosiloxane polymer is a polydiorganosiloxane having the formula $MeR'_2SiO(Me_2SiO)_y(MeR''SiO)_zSiMeR'_2$, wherein Me is the —CH₃ radical, R' is selected from the group consisting of the —CH₃ radical, the —OCH₃ radical, and the —OH radical, R'' is an aminoalkyl radical, y has an average value of from about 10 to about 600 and z has an average value of from about 1 to about 25.

6. The method of claim 5 wherein the aminoalkyl radical is —CH₂CH₂CH₂NHCH₂CH₂NH₂.

7. The method of claim 1, 2, 3, or 4 wherein the organosiloxane polymer is a polydiorganosiloxane having the formula $MeR'_2SiO(Me_2SiO)_y(MeR''SiO)_zSiMeR'_2$ wherein Me is the —CH₃ radical, R' is selected for the group consisting of the —CH$_3$ radical, the —OCH$_3$ radical, and the —OH radical, R" is an epoxyalkyl radical, y has an average value of from about 10 to about 600, and z has an average value of from about 1 to about 25.

8. The method of claim 7 wherein the epoxyalkyl radical is

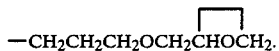
—CH$_2$CH$_2$CH$_2$OCH$_2$CHOCH$_2$.

9. A process for sizing a substrate, said process comprising:
(A) applying an aqueous dispersion of treated starch to said substrate, said aqueous dispersion of treated starch having been prepared by contacting said starch with from about 0.1% to about 15%, by weight, based on the weight of the starch, of an organosiloxane polymer, said contacting being done at a temperature of from about 60° C. to about 98° C., for a period of time at least 60 seconds in duration, and
(B) subsequently causing the water to evaporate from the applied aqueous dispersion.

10. The process of claim 9 wherein said contacting is done by adding the organosiloxane polymer to an aqueous dispersion of the starch.

11. The process of claim 10 wherein said aqueous dispersion of the starch is at a temperature of from about 60° C. to about 98° C. when the organosiloxane polymer is added to said aqueous dispersion of the starch.

12. The process of claim 9 wherein said contacting is done by adding the starch to an aqueous dispersion of the organosiloxane polymer.

13. The process of claim 9, 10, 11, or 12 wherein the organosiloxane polymer is a polydiorganosiloxane having the formula MeR'$_2$SiO(Me$_2$SiO)$_y$(MeR"SiO)$_z$SiMeR'$_2$ whereing Me is the —CH$_3$ radical, R' is selected from the group consisting of the —CH$_3$ radical, the —OCH$_3$ radical, and the —OH radical, R" is an aminoalkyl radical, y has an average value of from about 10 to about 600, and z has an average value of from about 1 to about 25.

14. The process of claim 13 wherein the aminoalkyl radical is —CH$_2$CH$_2$CH$_2$NHCH$_2$CH$_2$NH$_2$.

15. The process of claim 9, 10, 11, or 12 wherein the organosiloxane polymer is a polydiorganosiloxane having the formula MeR'$_2$SiO(Me$_2$SiO)$_y$(MeR"SiO)$_z$SiMeR'$_2$ whereing Me is the —CH$_3$ radical, R' is selected from the group consisting of the —CH$_3$ radical, the —OCH$_3$ radical, and the —OH radical, R" is an epoxyalkyl radical, y has an average value of from about 10 to about 600, and z has an average value of from about 1 to about 25.

16. The process of claim 15 wherein the epoxyalkyl radical is

—CH$_2$CH$_2$CH$_2$OCH$_2$CHOCH$_2$.

17. The process of claim 9 wherein the substrate is paper.
18. The process of claim 11 wherein the substrate is paper.
19. The process of claim 14 wherein the substrate is paper.
20. The process of claim 16 wherein the substrate is paper.
21. Starch treated by the method of claim 1.
22. A substrate sized by the process of claim 9.

* * * * *

UNITED STATES PATENT AND TRADEMARK OFFICE
CERTIFICATE OF CORRECTION

PATENT NO.  : 4,495,226
DATED       : January 22, 1985
INVENTOR(S) : Jari K. Smith It is certified that error appears in the above-identified patent and that said Letters Patent is hereby corrected as shown below:

In Column 6, line 48, "$2.45 \times 10^4 (J/m^3)^{178}$" should read -- $2.45 \times 10^4 (J/m^3)^{1/2}$ --.

In Column 13, line 15 (Table 4), "*300" should read -- >300 --.

In Column 14, line 68, "for" should read -- from --.

Signed and Sealed this

Twenty-eighth Day of May 1985

[SEAL]

Attest:

DONALD J. QUIGG

*Attesting Officer*   *Acting Commissioner of Patents and Trademarks*